(12) United States Patent
Barbara et al.

(10) Patent No.: US 10,132,102 B2
(45) Date of Patent: Nov. 20, 2018

(54) ADAPTER DEVICE

(71) Applicant: Alliance Tool Manufacturing, Inc., Dallas, TX (US)

(72) Inventors: David Barbara, Dallas, TX (US); Gerald Ridgely, Carrollton, TX (US)

(73) Assignee: Alliance Tool Manufacturing, Inc., Dallas, TX (US)

( * ) Notice: Subject to any disclaimer, the term of this patent is extended or adjusted under 35 U.S.C. 154(b) by 785 days.

(21) Appl. No.: 14/328,139

(22) Filed: Jul. 10, 2014

(65) Prior Publication Data

US 2016/0010359 A1    Jan. 14, 2016

Related U.S. Application Data

(60) Provisional application No. 61/944,920, filed on Feb. 26, 2014.

(51) Int. Cl.
| | |
|---|---|
| *E04H 17/26* | (2006.01) |
| *B66D 1/60* | (2006.01) |
| *B66F 13/00* | (2006.01) |
| *A01G 23/06* | (2006.01) |

(52) U.S. Cl.
CPC ............ *E04H 17/265* (2013.01); *B66D 1/60* (2013.01); *B66F 13/00* (2013.01); *A01G 23/065* (2013.01)

(58) Field of Classification Search
CPC .... B66C 1/12; B66C 1/14; B66C 1/16; B66C 1/18; A01G 23/062; A01G 23/065; E04H 17/265
See application file for complete search history.

(56) References Cited

U.S. PATENT DOCUMENTS

| | | | | |
|---|---|---|---|---|
| 281,492 | A * | 7/1883 | Green ...................... | B66C 1/48 294/104 |
| 2,233,083 | A * | 2/1941 | Mackenzie ............... | B66C 1/14 24/483 |
| 3,048,368 | A * | 8/1962 | Linabery, Sr. ......... | E04H 17/265 254/130 |
| 4,422,621 | A * | 12/1983 | Ekern ...................... | E02D 9/02 254/30 |
| 5,052,659 | A * | 10/1991 | Bates .................... | E04H 17/265 254/29 R |
| 5,141,276 | A * | 8/1992 | McClure .................. | B66C 1/62 294/104 |
| 6,257,555 | B1 * | 7/2001 | Barbara .................. | B66D 3/14 248/163.1 |

FOREIGN PATENT DOCUMENTS

GB             264269  A  *  1/1927  ............... B66C 1/12

* cited by examiner

*Primary Examiner* — Sang K Kim
*Assistant Examiner* — Nathaniel L Adams
(74) *Attorney, Agent, or Firm* — Braxton Perrone, PLLC

(57) ABSTRACT

A system and method for an adapter device. The adapter device can be used to couple to a pole for positioning or extraction. The adapter body has a first end coupled to a guiding edge and a second end coupled to a gripping edge. A securing device couples the adapter coupler to the adapter body via at least one coupler guide. The adapter coupler exits the coupler guide and forms a closed loop. When pulled, the closed loop tightens around and grips the pole.

13 Claims, 10 Drawing Sheets

ADAPTER DEVICE

PRIORITY

This application is a continuation-in-part to application Ser. No. 61/944,920 filed Feb. 26, 2014, the entirety of which is incorporated hereby by reference.

BACKGROUND OF THE INVENTION

Technical Field

The present invention relates generally to apparatus for applying pushing or pulling force and, more particularly, to portable implements for extracting stumps or poles from the ground.

Description of Related Art

Wooden fence posts are often anchored to the ground by concrete. After prolonged exposure to the weather, these posts rot necessitating removal of the concrete "stump" so that replacement posts can be installed. Unfortunately, concrete stump removal is a backbreaking task most often performed by first digging a hole around the stump and, then, lifting the stump from the hole and onto a truck for off-site disposal. A pair of laborers can perform this procedure in several hours using hand tools like shovels and pry bars. Inadvertently dropping the stump onto the foot or leg of a laborer is not uncommon and can result in a serious injury.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

DETAILED DESCRIPTION

Several embodiments of Applicant's invention will now be described with reference to the drawings. Unless otherwise noted, like elements will be identified by identical numbers throughout all figures. The invention illustratively disclosed herein suitably may be practiced in the absence of any element which is not specifically disclosed herein.

Figure 1:
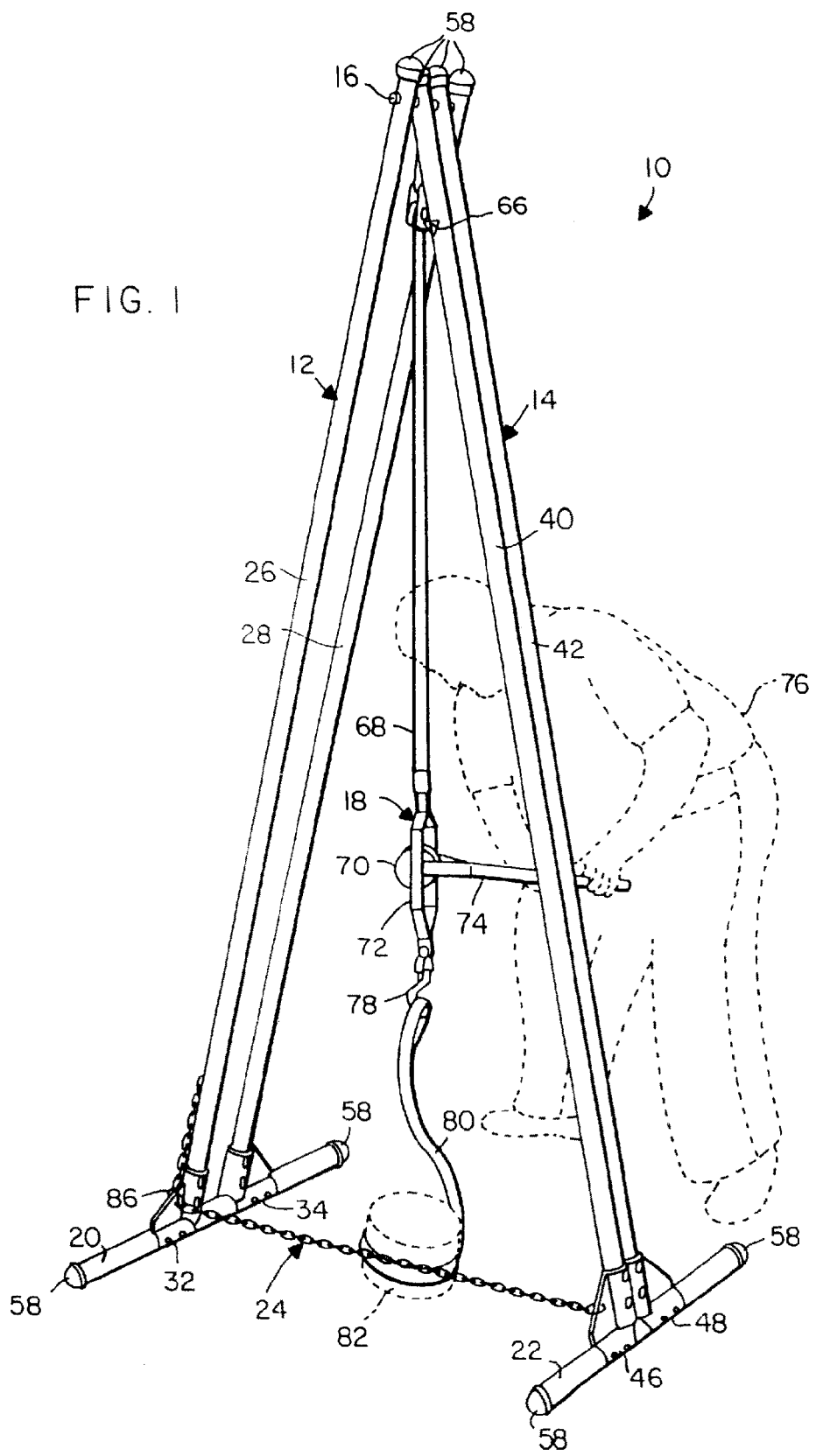
FIG. 1 is a perspective view of a stump and pole extraction device in accordance with the present invention.
Figure 2:
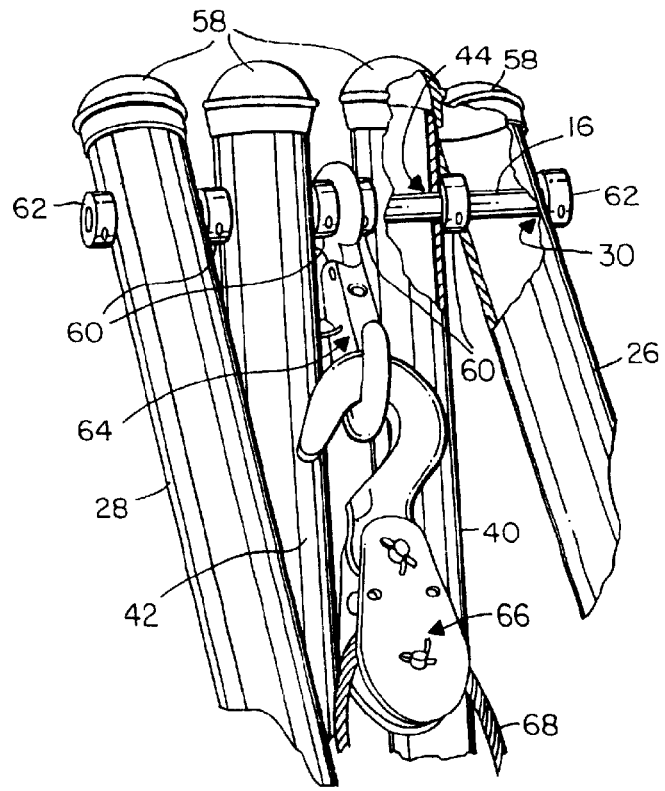
FIG. 2 is a perspective view of the top of the device of FIG. 1 with portions broken away to reveal details thereof.
Figure 3:
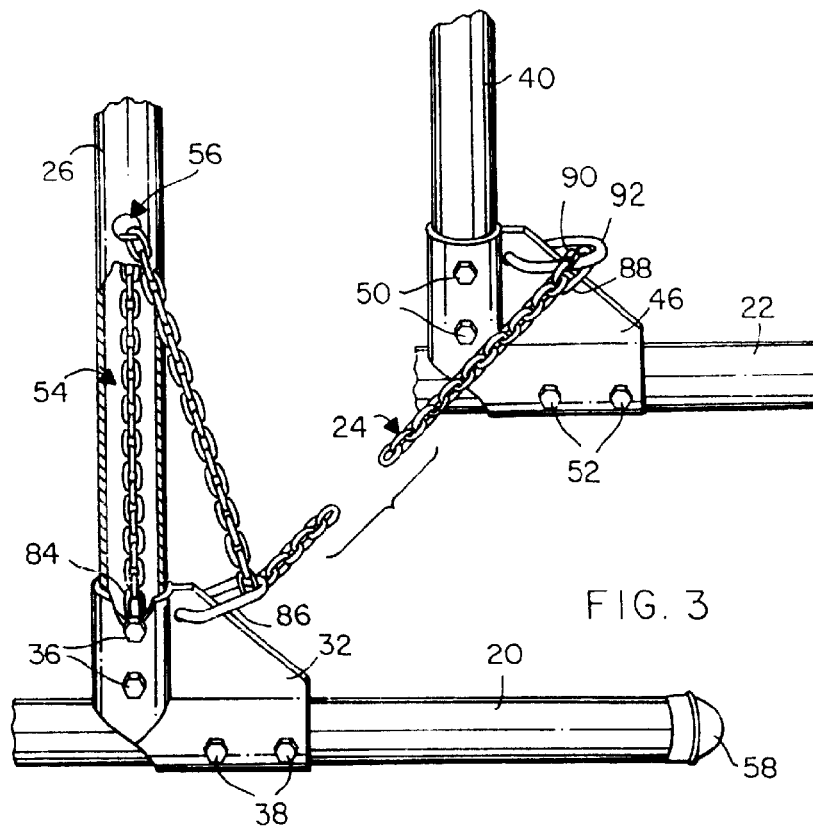
FIG. 3 is a perspective view of the bottom of the device with portions broken away.

FIG. 1 is a perspective view of a stump and pole extraction device in one embodiment. Referring now to the FIGS., a stump and pole extraction device 10 in accordance with one embodiment. In one embodiment, device 10 includes a pair of legs 12 and 14 hingedly joined together at their upper ends by a pivot pin 16 from which a winch 18 is suspended. Affixed to the lower ends of legs 12 and 14 are ground-engaging feet 20 and 22. Feet 20 and 22 are joined by a flexible connector 24 that serves to set the position of feet 20 and 22 on the ground and prevents the collapse of device 10 during use.

In one embodiment, and as depicted, leg 12 includes two, tubular members 26 and 28 positioned side-by-side. The tops of tubular members 26 and 28 are provided with axially aligned apertures 30 for receiving pivot pin 16. The bottoms of tubular members 26 and 28 are fitted into angle brackets 32 and 34 that join tubular members 26 and 28 to the center portion of foot 20. Brackets 32 and 34 are held in place by a plurality of threaded fasteners 36 penetrating brackets 32 and 34 and tubular members 26 and 28 as well as threaded fasteners 38 penetrating brackets 32 and 34 and foot 20. In one embodiment, one or more of the legs 12 and 14 comprise a handle. Such a handle allows for increased ease in moving the device 10. The handle can be integrally made within the device 10, or the handle can be coupled, such as via welding, bolts, etc. to the device 10.

Let 14, in one embodiment, comprises a pair of side-by-side, tubular members 40 and 42. Axially aligned apertures 44 are provided in the tops of tubular members 40 and 42 for pin 16. Angle brackets 46 and 48 are affixed by means of threaded fasteners 50 to the bottoms of tubular members 40 and 42. Threaded fasteners 52 secure brackets 46 and 48 to foot 22.

In one embodiment, tubular members 26, 28, 40 and 42 and feet 20 and 22 are formed of lightweight, metallic tubing. This material is for illustrative purposes only and should not be deemed limiting. The tubular members 26, 28, 40, 42 can comprise any material which can tolerate the applied force. Other materials such as wood, plastic, polymers, or other metals can also be utilized. In one non-limiting example, tubular members 26, 28, 40 and 42 all measure about 7 feet (2.1 m) in length and 1⅝ inches (4.1 cm) in diameter. These dimensions are but for one embodiment and should not be deemed limiting. The length and diameter of the tubular members can be adjusted depending on the item being pulled. The tubular members 26, 28, 40 and 42 can vary from about 3 feet to about 20 feet. In one embodiment, and as shown, tubular member 26 has an interior cavity 54 and an aperture 56 at a predetermined height above foot 20 which provides access to interior cavity 54. In one embodiment, each foot 20 and 22 is about 2 feet (61 cm) in length and has a diameter similar to that of the tubular members. The size and length of the feet 20, 22 can be adjusted depending upon the size of the legs 12, 14. In one embodiment, caps 58 are secured to the upper ends of tubular members 26, 28, 40 and 42 as well as the opposed ends of feet 20 and 22 to prevent the entry of dirt. In one embodiment, one or more of the feet comprises at least one wheel. For example, foot 20 can comprise a wheel. Such an embodiment allows for ease of movement of the device 10. In other embodiments each foot 20 and 22 comprises one or more wheels. In one embodiment, each foot 20 and 22 comprises two or more wheels.

In one embodiment, pivot pin 16 passes through apertures 30 and 44 to hingedly join legs 12 and 14. To prevent legs 12 and 14 from binding against one another, in one embodiment, set screw-retained collars 60 are positioned on pin 16 between tubular members 26, 28, 40 and 42. Similar collars 62 are secured to the opposed ends of pin 16 to lock tubular members 26, 28, 40 and 42 therebetween.

As depicted, and in one embodiment, a link 64 suspends a pulley 66 from pin 16 at a set distance from feet 20 and 22. A cable 68 extends from the rotatable drum 70 of winch 18 over pulley 66 and back to the drum-carrying frame 72 of winch 18 where it is securely fastened. By manually reciprocating winch lever 74, a user 76 of device 10 can selectively extend or retract cable 68 from drum 70 to raise and lower winch 18 with a mechanical advantage. A hook 78 secured to the bottom of winch 18 retains a sling 80 which may be wrapped around an object to be lifted such as concrete stump 82.

As depicted, a connector 24 couples the feet 20 and 24. In one embodiment the connector 24 is flexible. In one embodiment, the flexible connector 24 comprises a retractable chain formed from a plurality of interconnected links. In one embodiment, one link at 84 is affixed at the bottom of interior cavity 54 by a threaded fastener 36 running through its center. The chain extends upwardly away from link 84, out aperture 56 and through a ring 86 fastened to bracket 32. Another link 88 at the opposite end of connector 24 has a rotatable nut 90 that permits such to be selectively opened into a C-shape for releasable attachment to a ring 92 carried by bracket 46. This is for illustrative purposes only and should not be deemed limiting. The connector 24 can be coupled to the tubular members 26, 28, 40, 42 via any method or device known in the art.

When use of the chain is not required, it may be fed under the influence of gravity through aperture 56 and into interior cavity 54 for storage. In one embodiment, interior cavity 54 is dimensioned to receive the entirety of the chain. Nonetheless, by providing link 88 with a somewhat larger size than aperture 56, a stop feature can be provided to the chain that permits one end thereof to always be accessible. Thus, the chain can be easily extended from interior cavity 54 when its use is required.

Use of device 10 in one embodiment will now be described. First, user 76 positions feet 20 and 22 on opposite sides of an object being lifted from the ground like stump 82. Then, flexible connector 24 is extended from interior cavity 54 by pulling link 88 away from aperture 56 and through ring 86. Next, link 88 is attached to ring 92 by rotating nut 90 to open and, later, close link 88 on ring 92. Afterward, pulley 66 and winch 18 are suspended from pivot pin 16 and sling 80 is wrapped around stump 82. When sling 80 is secure, stump 82 is lifted from the ground by reciprocating winch lever 74. The elevated stump 82 can now be positioned on a cart (not shown) for transport off site. The entire process requires just minutes to finish and can be performed in complete safety.

While a manual lever 74 has been described, in other embodiments a motor is coupled to the winch. Thus, operation of the winch can be accomplished by a motor, engine, or other power source which can provide the necessary force to operate the winch. The motor, engine, or other power source can be mounted anywhere on the device 10. In one embodiment, the motor, engine, or other power source can be located on one or more of the legs 12. In other embodiments, it is mounted on an external structure.

Figure 4:
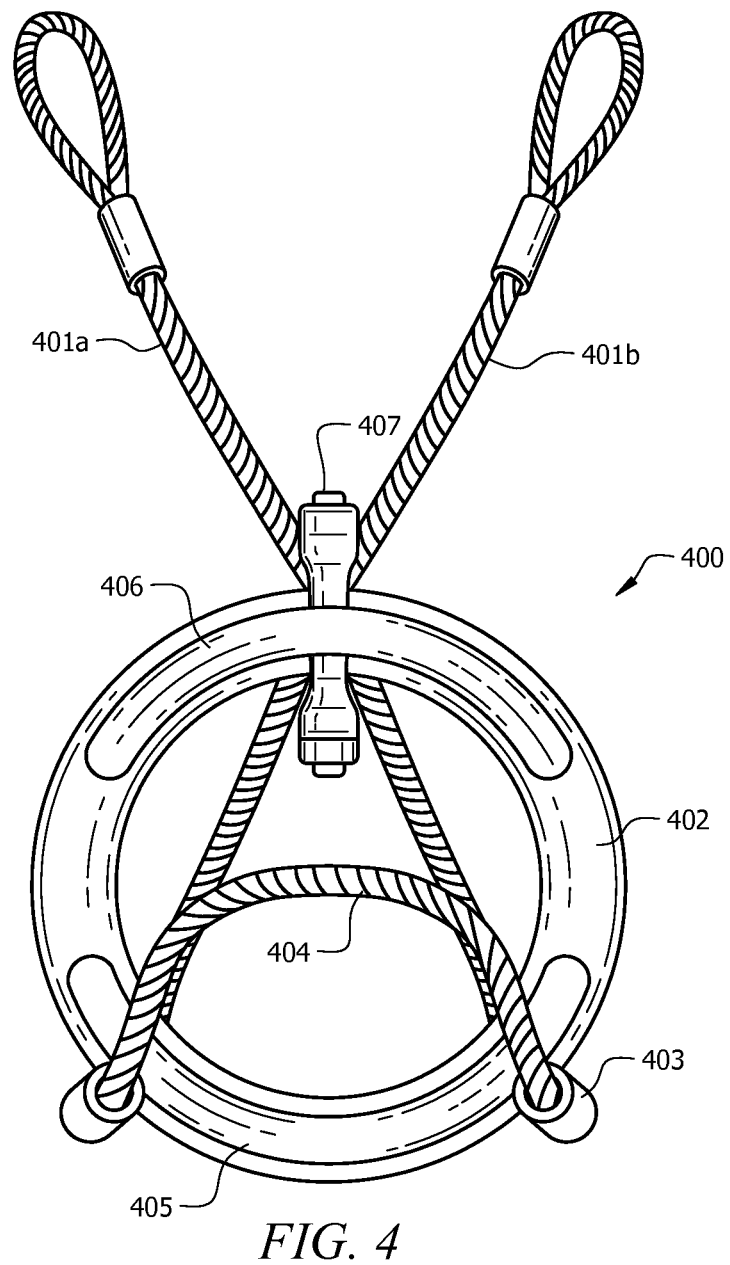
FIG. 4 is a top perspective view of an adapter device in one embodiment.

FIG. 4 is a top perspective view of an adapter device in one embodiment. The adapter device comprises an adapter coupler 401 which is coupled to an adapter body 402.

The adapter coupler 401 is any device which can couple the adapter 400 to the stump and pole extractor device 10 (in FIG. 1). The adapter coupler 401, in one embodiment, comprises a flexible coupler. The adapter coupler 401 can comprise a wire or group of wires, rope, cables, chains, strap, leather straps, etc. The adapter coupler 401 can be coupled to the stump and pole extractor device 10 via any method or device known in the art, including but not limited to, links, hooks, chains, connectors, carabiners, etc.

In one embodiment the adapter coupler 401 comprises a single, integrally made, piece. As depicted the adapter coupler 401 has a first end 401a and a second end 402a.

The adapter coupler 401 is attached to the adapter body 402 via a securing device 407. In one embodiment the securing device 407 couples the adapter coupler 401 to the adapter body 402 but allows the adapter coupler 401 to slide relative to the securing device 407. The securing device 407 can comprise any device known in the art which can couple a wire, for example, to a stationary object. In one embodiment the securing device 407 is allowed to slide along the adapter body 402. As depicted the securing device 407 comprises a metal ring with two hoops. The first hoop surrounds and is coupled portion of the adapter body 402. In the embodiment depicted, the guiding edge 406, discussed in more detail below, has a hole through which the first hoop is inserted and secured via a bolt or the like. This secures the securing device 407 to the adapter body 402. The second hoop is coupled to the first hoop, and the adapter coupler 401 is inserted through the second hoop. While an embodiment with two hoops has been described, this is for illustrative purposes only and should not be deemed limiting. In other embodiments both the adapter coupler 401 and the adapter body 402 are coupled to a single ring. In still other embodiments the securing device 407 comprises a coupler guide 403, which is discussed in more detail below. In other embodiments the securing device 407 comprises a shaft extending from the adapter body 402 which comprises a loop through which the adapter coupler is inserted. In other embodiments the adapter comprises a FIG. 8 shape, with the first ring being used as the adapter body 402 while the second ring is used as the securing device 407. Further, while an embodiment has been described and shown in FIG. 4 wherein the securing device 407 comprises a separate piece which is coupled to the adapter body 402, this is for illustrative purposes and should not be deemed limiting. In one embodiment, the securing device 407 is integrally made with the adapter body 402. As used herein, integrally made means that the parts are forged, molded, cast, or otherwise created as a single piece. Thus, for purposes of illustration, an embodiment of FIG. 4 will be discussed with the distinct features as being welded, bolted, or otherwise coupled to the adapter body 402, in other embodiments one or more features is integrally made with the adapter body 402.

In one embodiment, and as depicted, both the first end 401a and the second end 401b are threaded through the securing device 407. The first end 401a is threaded through the securing device 407 and to the right couple guide 403, as depicted. The second end 401b is threaded through the securing device 407 and to the left couple guide 403, as depicted. This embodiment is referred to as a crossed configuration. In other embodiments, referred to as a straight configuration, the first end 401a is threaded through the securing device 407 and to the left coupler guide 403.

The coupler guide 403 is a hole, channel, or tunnel through which the adapter coupler 401 is inserted and secured to the adapter body 402. In one embodiment the adapter device 400 comprises at least one coupler guide 403. In such embodiments both ends are fed through a single coupler guide 403 and the loop 404 forms from the single coupler guide 403. In other embodiments, and as depicted, the adapter device 400 comprises two coupler guides 403 with each having one end of the adapter coupler 401. Upon exiting the coupler guides 403, the two ends of the adapter coupler 401 meet as a loop 404. In one embodiment the loop 404 is located between the two coupler guides 403.

As depicted the coupler guide 403 comprises an external channel which is coupled to the adapter body 402. The channel, in one embodiment, comprises an external tube. The channel comprises a diameter greater than the diameter of the adapter coupler 401 such that the adapter coupler 401 can slide relative to the channel. In one embodiment, the coupler guide 403 is permanently adhered to the adapter body 402 such as by welding or the like such that the coupler guide 403 is stationary. While an embodiment has been described wherein the coupler guide 403 comprises an external channel, this is for illustrative purposes only and should not be deemed limiting. In one embodiment the coupler guide 403 comprises a loop device similar to the securing device 407 discussed above. An external coupler guide 403 which is located on the external surface of the adapter body 402, in one embodiment, has the benefit in that by being located on the external surface, the coupler guide 403 does not interfere with or contact the stump, pole, or other object which is being removed.

A channel or tube, so as the tube depicted in FIG. 4, also has a benefit of directing and controlling the adapter coupler 401. In one embodiment the channel is greater than three inches long, though this length will be dependent upon the size of the adapter. This length allows the coupler guide 403 to control the curvature and direction of the adapter coupler 401.

As can be seen in FIG. 1, in one embodiment the adapter coupler 401 exits the coupler guide 403 and forms a loop 404. As noted, in one embodiment the adapter coupler 401 comprises a single integral piece. In other embodiments, however, the adapter coupler 401 comprises two or more separate pieces, or wire for example, coupled together end to end.

Figure 5:
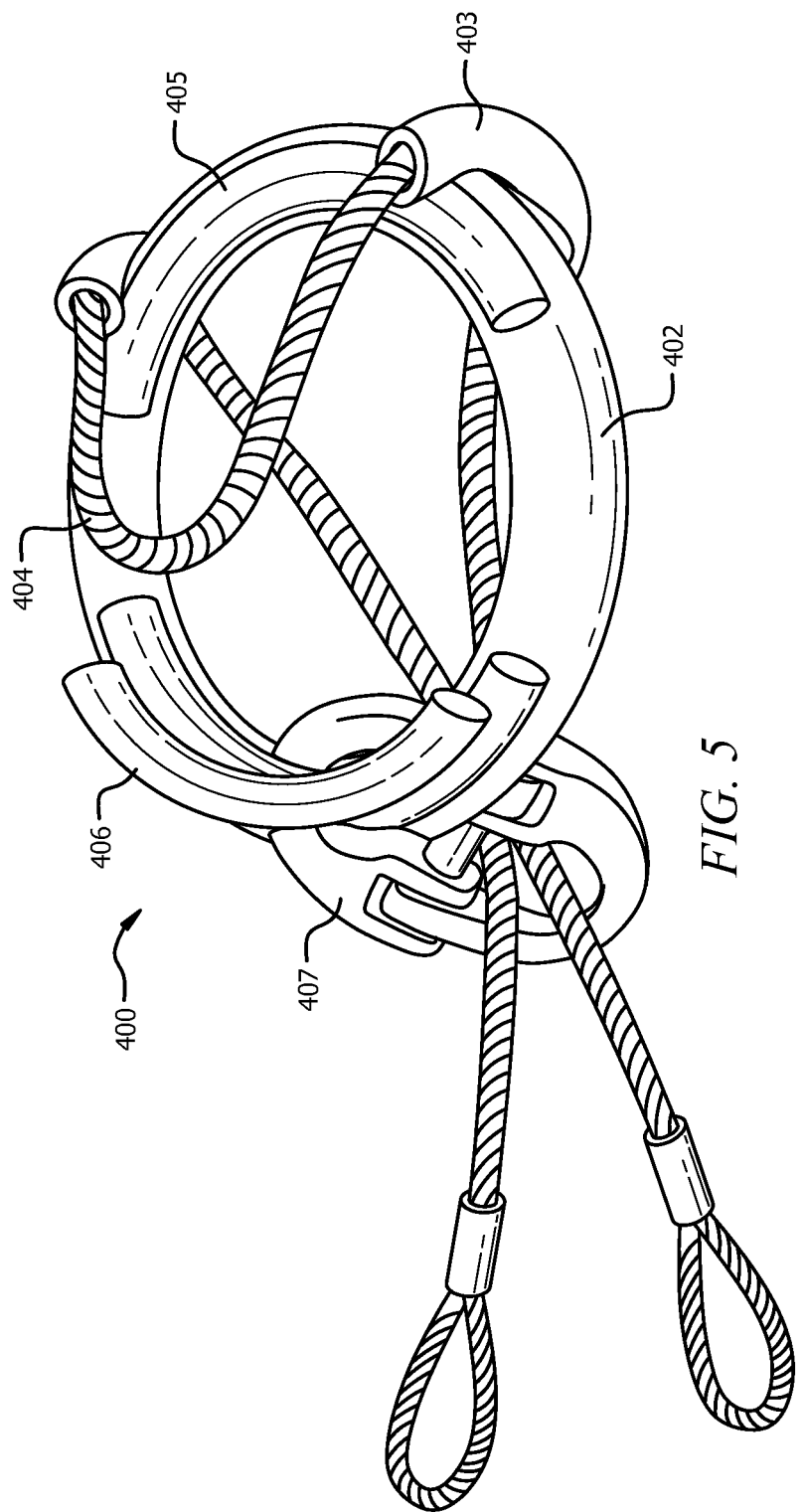
FIG. 5 is a side perspective view of the adapter in one embodiment.
Figure 6:
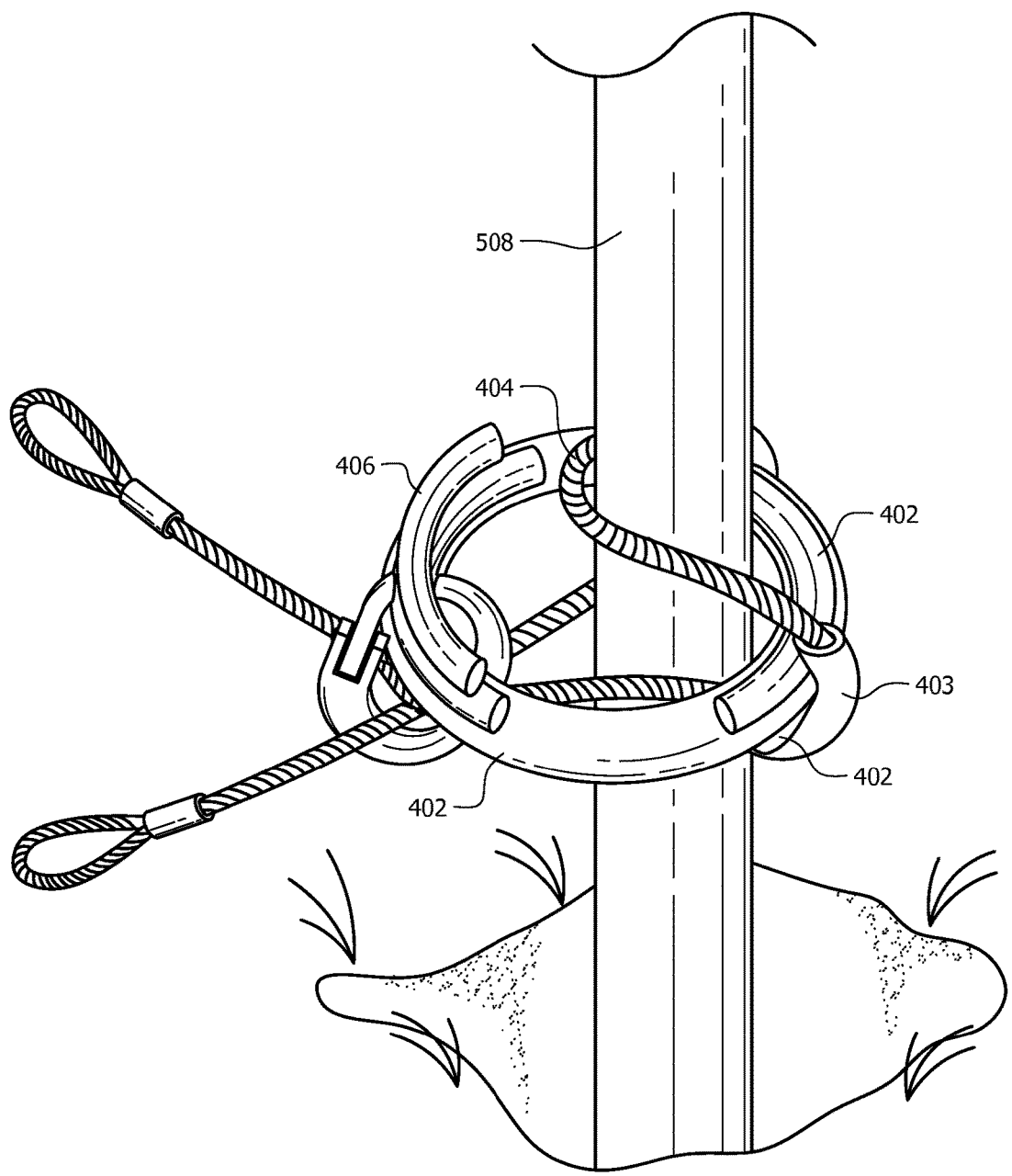
FIG. 6 depicts an embodiment wherein the adapter is in is alignment position with the loop above the adapter body.

FIG. 5 is a side perspective view of the adapter in one embodiment. FIG. 6, shown and discussed below, depicts an embodiment wherein the adapter is in is alignment position with the loop above the adapter body. As can be seen, in the embodiment depicted the adapter body 402 comprises a circular shape. As depicted, the adapter body 402 comprises a fully closed shape. A closed shape refers to a shape which has no openings along its perimeter. As can be seen in FIGS. 4-6, the adapter body 402 has no opening along the circumference of the body; the only way a pole, for example, can be inserted into the adapter body 402 is through the void at the circle of the adapter body 402. Thus, to align an adapter comprising a closed shape, the user slides the adapter over the top of the pole. In other embodiments, however, the adapter body 402 comprises an open shape. An open shape is a shape wherein the body comprises a gap or a hole along the perimeter through which the pole can be inserted. Thus, for example, in some embodiments the adapter body 402 comprises a gate, which when opened, allows a pole, for example, to be inserted. In some embodiments, an open shape, such as a gate, allows the adapter to be aligned without having to slide the adapter over the top of the pole. Instead, the adapter can be positioned so as to allow the pole to slide through the gate, for example. The open shape can comprise a gate, a hinge, etc. In one embodiment the gate comprises a one-way gate which allows a pole to be inserted but not removed. The hinge or gate can be located at any point on the adapter body 402. In one embodiment the gate is located between the coupler guides 403. Such an arrangement allows the loop 404, discussed in more detail below, to surround the pole or other object to be retracted.

As noted, in one embodiment the adapter body 402 is circular in shape. A circular shape helps spread the force along the curve of the circle. A circular shape, however, is for illustrative purposes only and should not be deemed limiting. The adapter body 402 can comprise virtually any shape, including square, rectangle, oval, FIG. 8, elliptical shapes, etc. In one embodiment the adapter body 402 comprises a similar shape as the stump or pole being pulled. For example, if the pole to be removed has a circular cross-section, then in one embodiment the adapter body 402 comprises a circular cross-section Likewise, if the post to be removed is a square wooden post, then in one embodiment the adapter body 402 comprises a square cross-section.

The adapter body 402 can comprise virtually any size. In one embodiment the adapter body 402 has an opening of between about 3 inches to about 4 feet in diameter or larger depending on the task.

The adapter body 402 can comprise virtually any strong material. The adapter body 402 can comprise iron, steel, metal, rigid plastics, high carbon steel, etc.

Referring to FIG. 5, the adapter body 402 comprises two ends: a first end located on the left side of FIG. 5 which is coupled to the guiding edge 406, and a second end located on the right side of FIG. 5 which is coupled to the gripping edge 405. In the embodiment depicted the securing device 407 is located on and coupled to the first left side. In one embodiment the coupler guide 403 is located on and coupled to the second right side of the adapter body 402.

Coupled to the adapter body 402 is the guiding edge 406. The guiding edge 406, in one embodiment, sits atop, and extends upward from the face of the adapter body 402 when the adapter body is in its aligned position with the loop 404 above the adapter body 402. In one embodiment the guiding edge 406 extends a length of between about 50 % to about 300 % of the width of the adapter body 402. In other embodiments the guiding edge 406 extends downward from the adapter body 402. In still other embodiments the guiding edge extends 406 both upward and downward from the adapter body. As used herein, upward refers to a location relative to an object. Thus, the loop 404 depicted in FIG. 5 is upward relative to the downward adapter body 402. The guiding edge 406 can be integrally made with the adapter body 402, or it can be adhered thereto via welding, bolting, or any other method or device for coupling two objects. The guiding edge 406 can comprise virtually any material. In one embodiment the guiding edge 406 covers less than half of the perimeter of the adapter body 402. This results in decreased weight, decreased manufacturing materials, and consequently, decreased manufacturing cost.

Turning to FIG. 6, FIG. 6 depicts the adapter body in its aligned position. As can be seen, the loop 404 is located above the adapter body 402. The guiding edge 406 guides the pole 608 into the void of the adapter body 402 and helps maintain the adapter body 402 in its desired position surrounding the pole 408. A pole 608, as used herein, refers to any device which is to be extracted from the ground, and includes, but is not limited to a stump, a post, telephone pole, utility pole, structural pole, fence post, sign post, drill bit, tent poles, debris, manufacturing materials, or anything desired to be removed and/or suspended.

Also depicted in FIGS. 5 and 6 is the gripping edge 405. The gripping edge 405, like the guiding edge 406, can extend below, above, or both, from the face of the adapter body 402. In one embodiment the gripping edge 405 extends a length of between about 50 % to about 300% of the width of the adapter body 402. As depicted in FIGS. 5 and 6, the gripping edge 405 extends upward and downward from the face of the adapter body 402. The gripping edge 405 can comprise similar materials and sizes as the guiding edge 406. The gripping edge 405 can be integrally made with the adapter body 402, or it can be adhered thereto via welding, bolting, or any other method or device for coupling two objects. In one embodiment the guiding edge 406 covers less than half of the perimeter of the adapter body 402.

As depicted in FIG. 6, the pole 508 is pulled adjacent to the gripping edge 405 by the loop 404. The loop 404 is under tension from up above from the stump and pole extractor device 10. This tension causes the loop 404 to pull the pole 508 toward the gripping edge 405. The pole 508 is secured within the adapter body 402 by the tension in the loop 404 and the friction provided by the gripping edge 405. Thus, the gripping edge 405 grips the pole 508.

In one embodiment, when helped under tension, the adapter body 402 may pivot causing the guiding edge 406 to engage and grip the pole 508. Thus, in one embodiment the guiding edge 406 functions as a gripping edge 405 by gripping and engaging the pole 508.

In one embodiment the gripping edge 405 and/or the guiding edge 406 comprise a smooth interior face. The interior face is the side of the edge which contacts the pole 508. In other embodiments, however, the interior face of the gripping edge 405 and/or the guiding edge 406 comprises a rough or altered geometry. A rough surface increases friction compared to a smooth surface. Increasing friction results in a stronger grip on the pole 508. A better grip on the pole 508 results in decreased downtime, increased efficiency, and increased safety. Thus, as depicted, the gripping edge 405 and the guiding edge 406 comprises small raised features which extend beyond the planar face of the edge, creating a rough surface and increasing grip.

Figure 7:
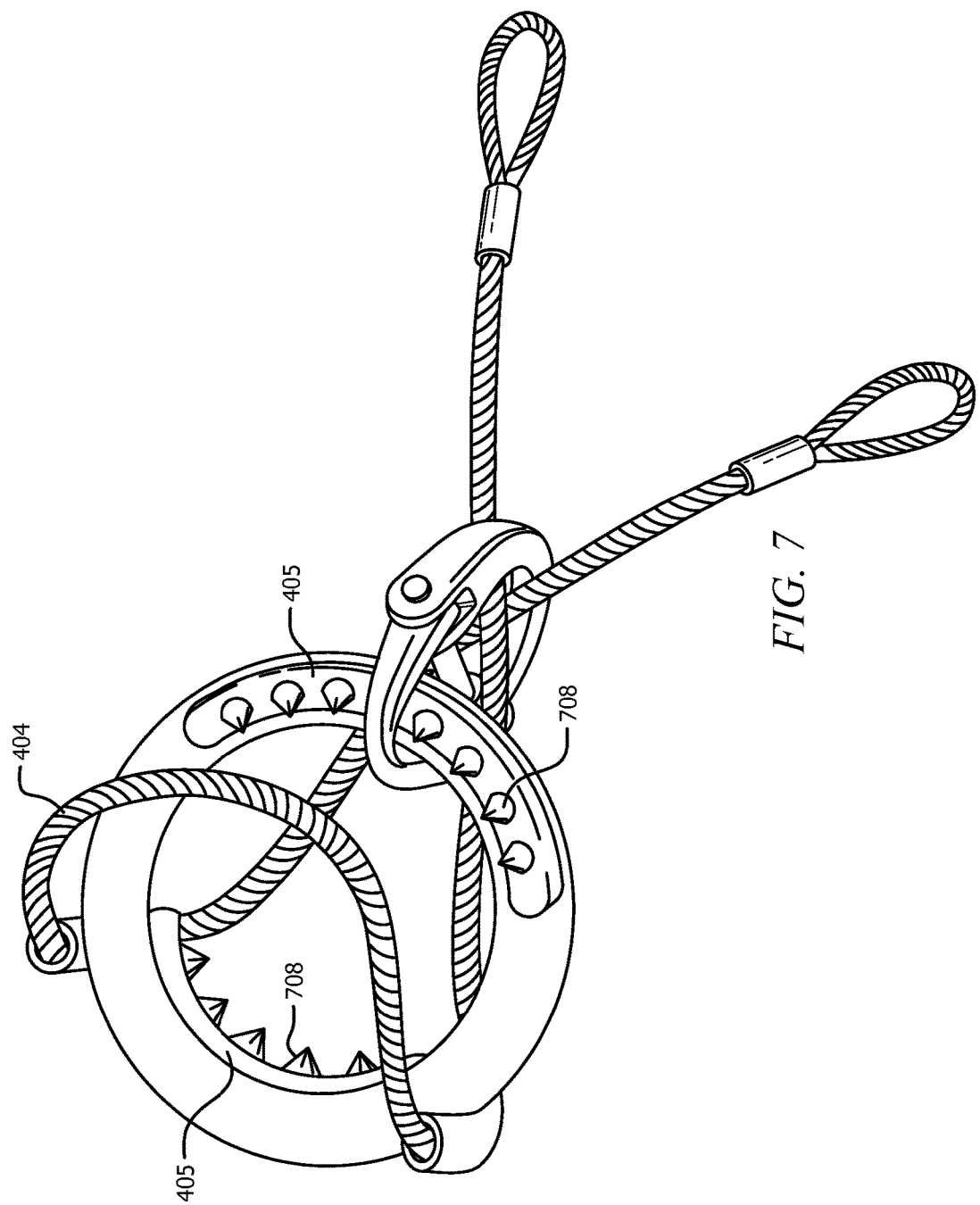
FIG. 7 depicts a perspective view wherein the gripping edge and the guiding edge comprise spikes in one embodiment.

In other embodiments the features which extend beyond the planar face are more exaggerated. FIG. 7 depicts a perspective view wherein the gripping edge 405 and the guiding edge 406 comprise spikes 708. In one embodiment, and as depicted, a plurality of pointed spikes extend beyond the planar face of the gripper edge 405 and/or the guiding edge 406. Spikes 708 increase the grip upon the pole 508. In one embodiment, spikes are utilized when the pole 508 comprises a wooden post. In such embodiments, the spikes 708 partially penetrate the wood, resulting in a better grip.

While an embodiment has been described wherein the adapter device 400 is oriented such that the loop 404 is above the adapter body 402, this is for illustrative purposes only and should not be deemed limiting. In other embodiments the adapter body 402 is rotated 180° such that the loop 404 is located below the adapter body 402. The retractor device and adapter device 400 will function in either orientation.

Figure 8:
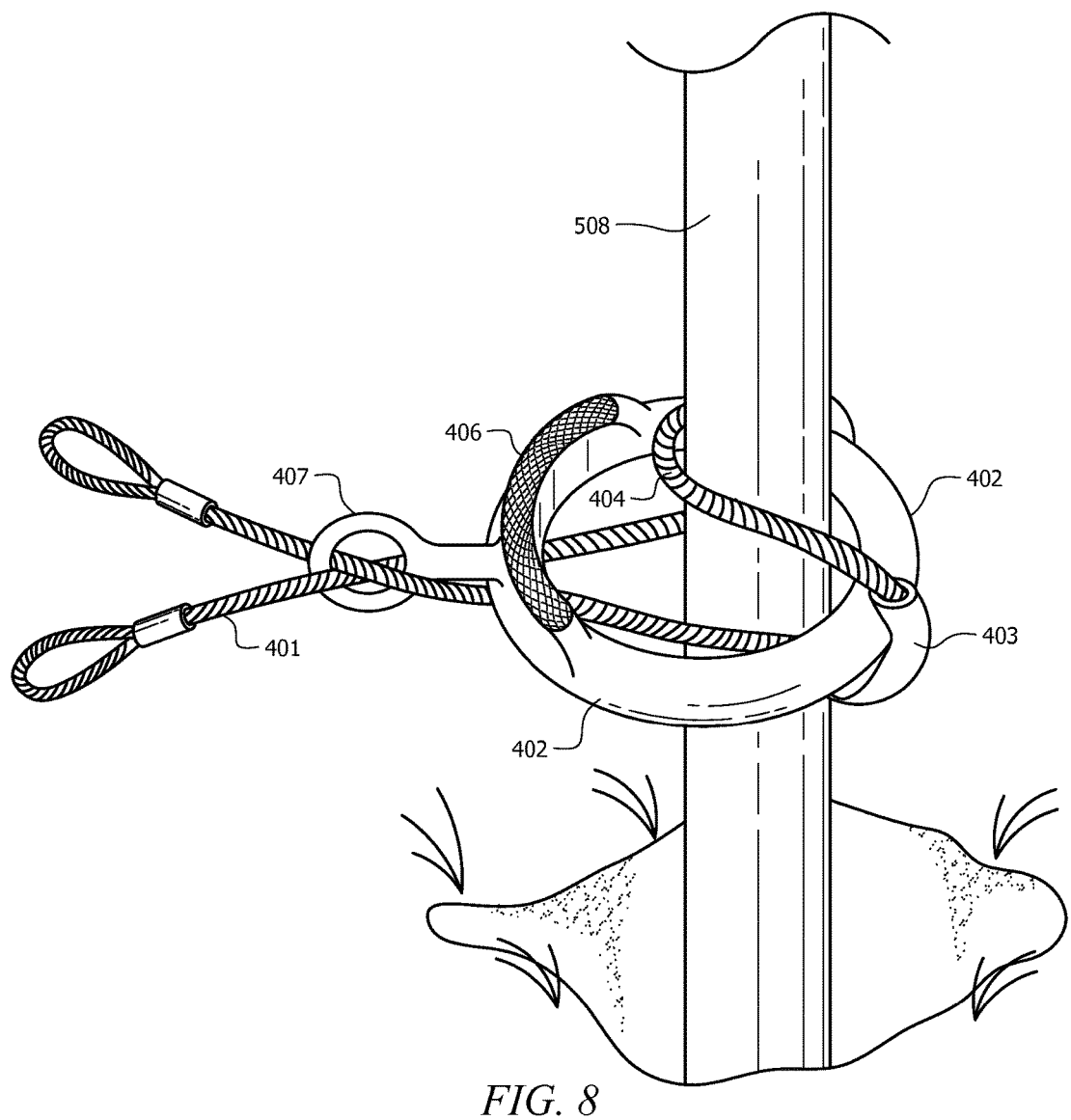
FIG. 8 depicts a perspective view wherein the adapter comprises one integrally made piece.

FIG. 8 depicts a perspective view wherein the adapter comprises one integrally made piece. As shown, the securing device 407 comprises a shaft coupled to the adapter body 402 and a loop through which the coupler guide 401 is inserted. The securing device 407 is integrally made with the adapter body 402. Also integrally made with the adapter body 402, as depicted, are the guiding edge 406, the gripping edge 405, and the coupler guide 403. The gripping edge is located on the bottom side of the adapter body 402 whereas the guiding edge 406 is located on the top side of the adapter body. Accordingly, as depicted, the adapter comprises a single integrally made piece. A single integrally made piece offers several advantages. First, is reduced manufacturing complexity compared to an article with several pieces which must be coupled. Additional parts, in some embodiments, increases the likelihood that one of the parts will be defective or improperly connected. As such, having a single integrally made piece reduces manufacturing complexity and increases safety.

Another advantage of an integrally made piece, in one embodiment, is reduced cost and weight. Further, an integrally made piece is more streamlined than and not as clumsy as an adapter with several distinct parts.

As depicted, the guiding edge 406 and the gripping edge 405 comprise a knurled surface. A knurled surface is a surface which has been modified to comprise knurls. Knurls provide a surface for increased gripping. Knurls, or other such modified surfaces, can be added to the surface or can be created simultaneously with the surface such as via molding, casting, or the like.

In one embodiment, the surface of the guiding edge 406 and/or the gripping edge 405 are removable. Such an embodiment allows the surface of the guiding edge 406 and/or the gripping edge 405 to be exchanged with a different surface. For example, the knurled guiding edge 406 of FIG. 8 can be replaced with the spiked guiding edge 406 of FIG. 7. Thus, the same adapter can be utilized with metal posts, and then the guiding edge 406 and/or the gripping edge 405 can be replaced with spikes and used with wooden posts. Such adaptability increases the versatility of the adapter.

The removable surfaces can be removed via any method or device known in the art. The surfaces can be removably coupled via bolting, screws, etc. In one embodiment the removable surface comprises a tongue and grove which couples the removable surface to the adapter body.

Figure 9A:
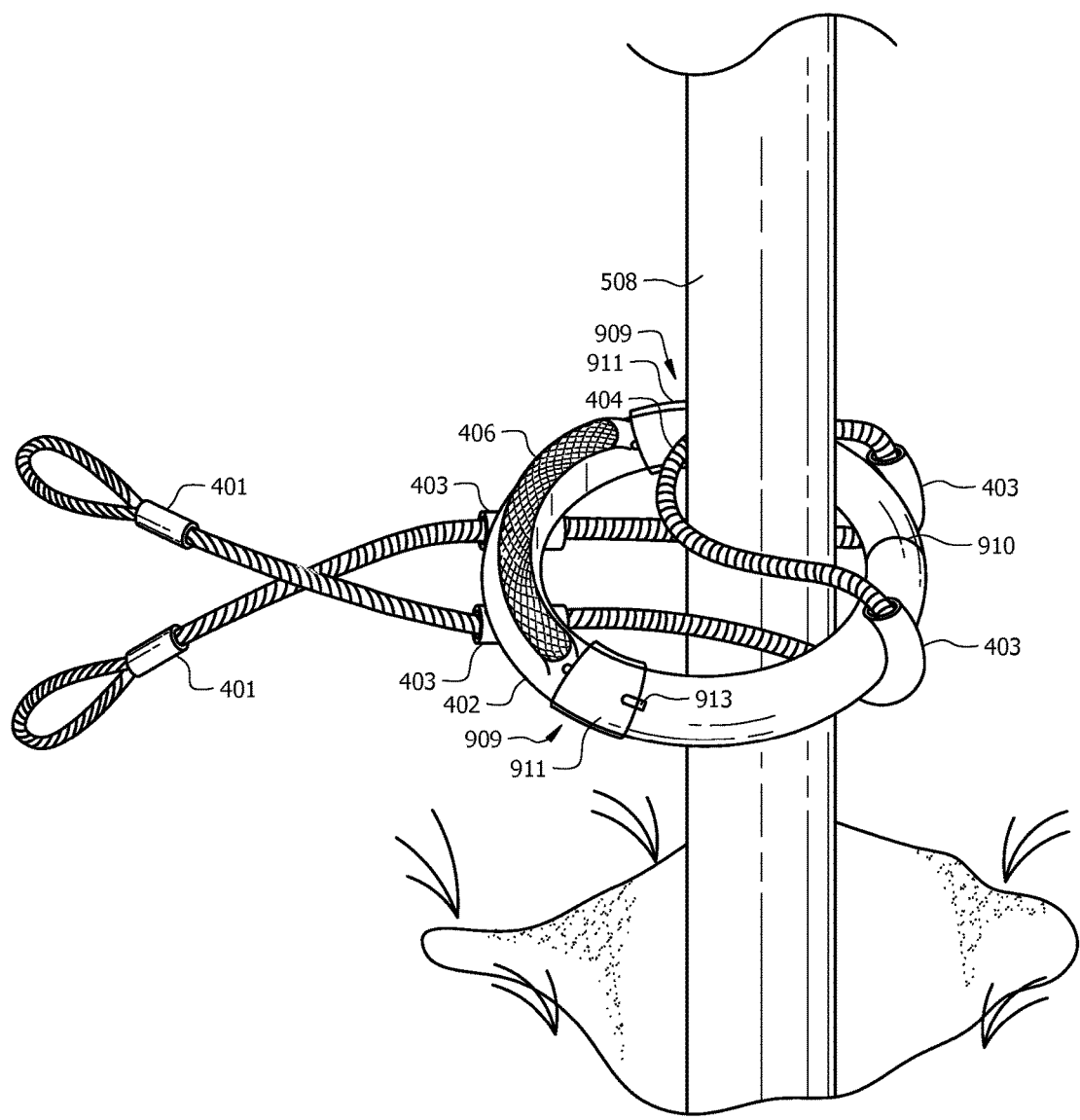
FIG. 9A depicts a top perspective view of an adapter in one embodiment.
Figure 9B:
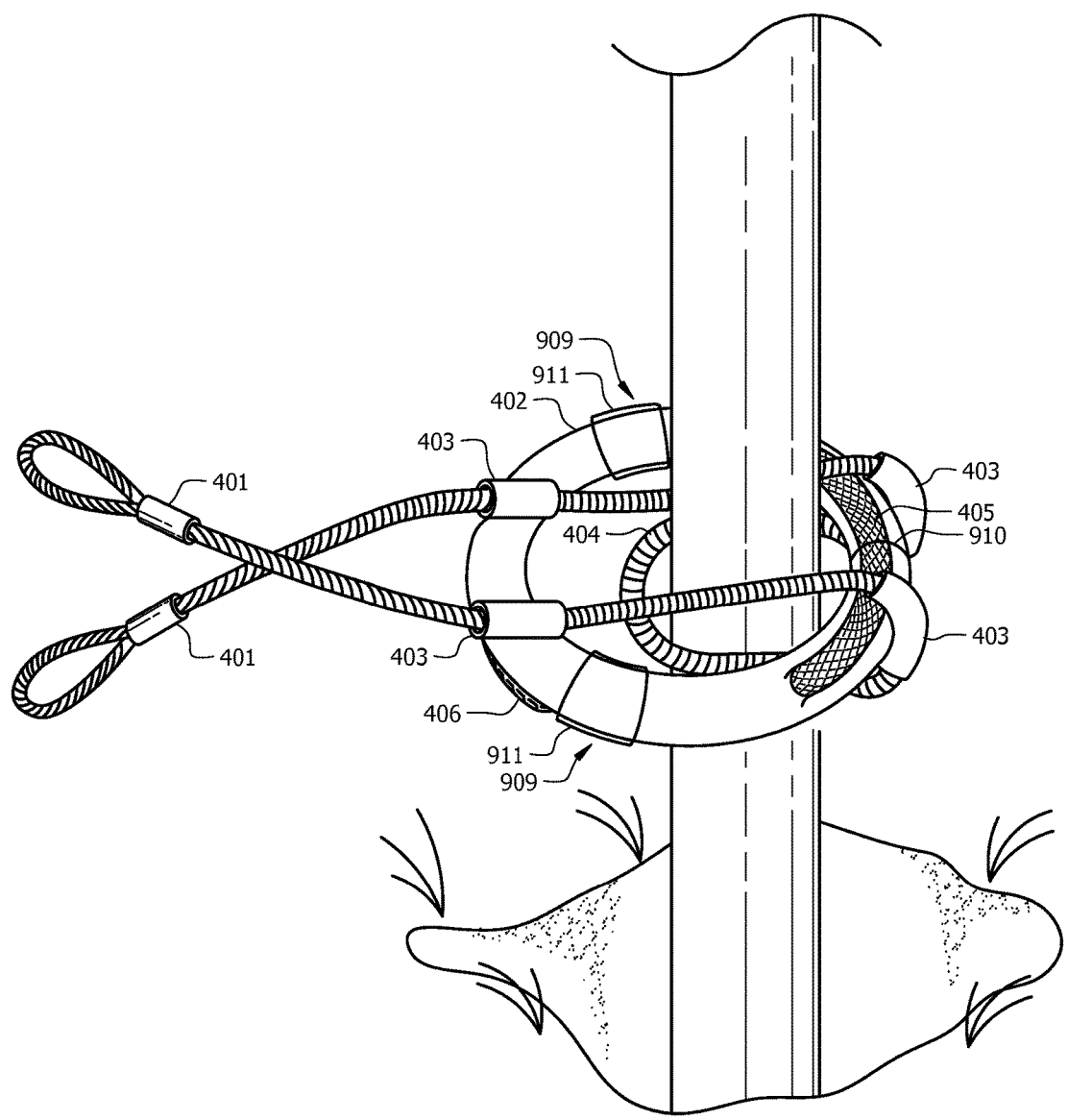
FIG. 9B depicts a bottom perspective view of an adapter in one embodiment.

Turning to FIG. 9A, FIG. 9A depicts a top perspective view of an adapter in one embodiment. FIG. 9B depicts a bottom perspective view of an adapter in one embodiment. As depicted in FIG. 9A and 9B, the adapter body comprises two sets of coupler guides 403. Thus, the coupler guides 403 on the left act as a securing device 407. The coupler guides 403 on the right side of FIG. 9A are curved. Such curved guides 403 allow the coupler 401 to be guided from below the adapter body 402 in FIG. 9A to above the adapter body 402 to form a loop 404. The coupler guides 403 on the left, as depicted, are straight guides which are approximately perpendicular with the pole 508, as depicted. The straight coupler guides 403 maintain the coupler 401 in a straight orientation and accordingly, prevents undesirable kinking.

As depicted, the guiding edge 406 is located on a top side of the adapter body 402, and is knurled. The gripping edge 405 is also knurled and is located on the bottom side of the adapter body 402.

In one embodiment, the adapter body 402 comprises at least one hinge 909 and at least one gate 910. As previously discussed, the hinge and gate can be located at any location on the adapter body. A hinge 909 allows the adapter body 402 to pivot at the hinge point. The hinge can comprise any hinge known in the art which allows two members to pivot about a point. A gate 910 is where two members intersect and couple, forming a secure structure. In one embodiment, the gate 910 locks.

In operation, the adapter body 402 separates at the gate 910 and pivots at the hinge 909. In such a manner, the adapter body 402 can be opened and placed around the side of a pole as opposed to having to be lifted above the pole. Such an ability reduces the time necessary to place the adapter in position.

As noted, the location of the gate 910 and hinge 909 can vary. In one embodiment, and as depicted, the gate 910 is located between the coupler guides 403 on the right, adjacent to the loop side. It can be seen that when the adapter body 402 separates at the gate 910, a void is formed between the separated adapter body 402. A pole 508 can be positioned to fit through the void so as to be within the confines of the adapter body 402. Because, as depicted, the gate 910 is located on the loop side, when a pole 508 is inserted through the void formed by the gate 910, the pole is automatically surrounded by the loop 404. This is advantageous because neither the loop 404, nor the adapter body 402 need to be lowered from the top of a pole 508. For example, for a 20 foot pole, the adapter body 402 can be opened and positioned around the pole five feet above the ground. This is more efficient that requiring a user to drop the adapter body 402 from the top of the 20 foot pole.

As depicted, there are two hinges 909 and one gate 910. This allows the adapter to open widely at the location of the hinges 909. As discussed, the adapter is opened, placed around the pole, and then closed. As depicted the hinges 909 are located outside of the coupler guides 403. Thus, the hinges 909, as depicted, are not located between the coupler guides 403. The first hinge 909 is visible, but the second hinge 909 is not visible in FIGS. 9A or 9B because it is located behind the pole 508.

Figure 10:
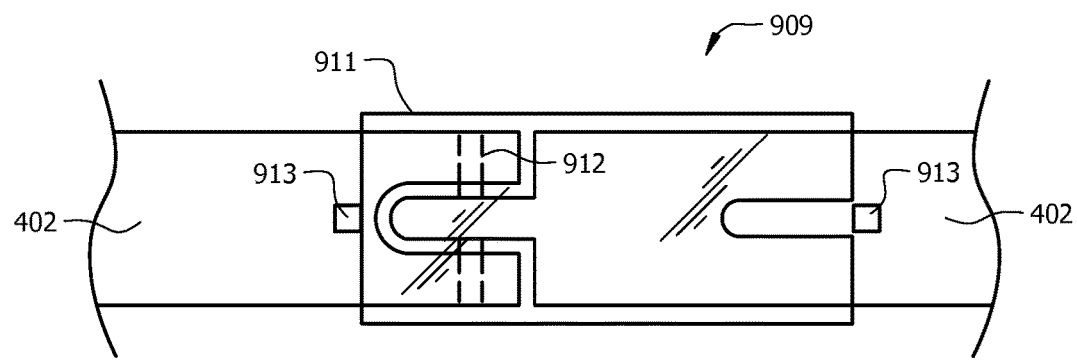
FIG. 10 depicts a side view of a hinge in one embodiment.

FIG. 10 depicts a side view of a hinge in one embodiment. As depicted the hinge 909 comprises a pin 912 which allows the left portion of the adapter body 402 to pivot with respect to the right portion of the adapter body 402. As depicted, the left portion of the adapter body 402 comprises a female portion which couples with the male portion of the right side of the adapter body 402. In one embodiment, and as depicted, the hinge 909 comprises a locking mechanism which prevents the hinge 909 from pivoting when not desired. The locking mechanism can comprise any device known in the art which prevents the hinge 909 from pivoting. In operation, the locking mechanism can be engaged when, for example, the adapter is positioned around the pole and is ready to be engaged. As depicted, the locking mechanism comprises a sheath 911 which surrounds the hinge 909. In normal operation, the sheath 911 engages the adapter body 402 such that it cannot pivot about the pin 912. However, when the sheath 911 is slid to the right, the sheath 911 no longer covers the pin 912, allowing the adapter body to pivot about pin 912. As depicted, the adapter body further comprises locking protrusions 913 which extend beyond the planar surface of the adapter body 402 and which prevents the sheath 911 from advancing. The sheath 911 has a slot which can receive the locking protrusion 913 to allow the sheath 911 to slide to the right. In one embodiment the sheath 911 is under spring or other tension, causing the sheath to assume the locked position.

As noted, in one embodiment the hinge 909 is oriented such that the pin 912 is approximately parallel to the pole. This causes the weight of the load to be aligned with the orientation of the pin 912. This also ensures that the hinge 909 opens in an orientation approximately perpendicular to the force of the weight of the load. While one embodiment has been described with reference to the hinge depicted in FIG. 10, this is for illustrative purposes only and should not be deemed limiting. Those skilled in the art would understand that different hinges and different locking mechanisms can be utilized.

Figure 11:
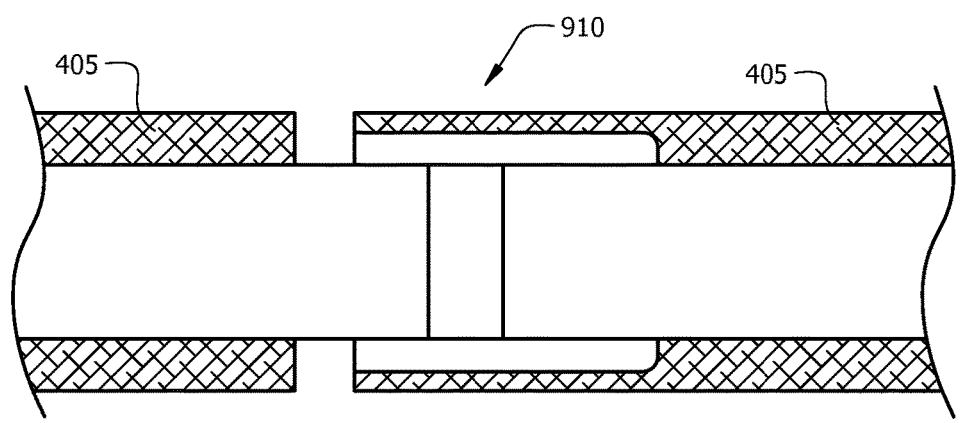
FIG. 11 depicts a side view of a gate in one embodiment.

FIG. 11 depicts a side view of a gate in one embodiment. The gate includes a gap between the left portion of the adapter body and the right portion of the adapter body. As depicted, the right portion of the adapter body comprises an overhang, underhang, or combinations of both which extends beyond the adapter body and which receives the left portion of the adapter body. When the adapter body 402 is opened, the adapter body 402 pivots, separating the left portion of the adapter body from the right portion of the adapter body as depicted in FIG. 11. This forms a gap located at the location of the gate 910 through which a pole can be inserted. Thereafter, the adapter body closes at the hinge 909, and the adapter body is recoupled at the location of the gate. The left portion of the adapter body is received by the right portion of the adapter body and is supported by the overhang, underhang, or combinations thereof. The weight of the load, in one embodiment, is supported by the overhang. The overhang, underhang, etc., in one embodiment, comprises the gripping edge 405 and/or the guiding edge 406. In operation, the weight of the load pulls downward on the adapter, causing the adapter to remain in a locked and closed position. While not depicted, the gate 910 can comprise a locking mechanism such as the sheath 911 discussed above.

The adapter device 400 discussed herein has several advantages. First, a single adapter device 400 can be utilize to extract poles of various sizes and shapes. As an example, one adapter device 400 which has 6 inch diameter can be used to extract a cylindrical three inch pole and a four inch diameter square post. Thus, one advantage is versatility.

A second advantage is speed. Tying and securing a pole with a cable takes a lot of time. The pole must be wrapped several times around, tied, etc. in an attempt to secure the cable to the pole. The adapter device 400 quickly secures to the pole to be extracted. Often an extraction job will involve extracting 20 or more poles. Decreasing the time required to secure each pole prior to extraction results in tremendous time savings.

A third advantage is reduced labor requirements and therefore reduced labor costs. A pole can be removed more quickly compared to previous methods. Accordingly, less labor is required to complete a given job.

A fourth advantage is safety. Often significant tension is required to extract poles. If a grip is lost on the pole, then the pole can drop or the wire can swing, causing possible injury. Having increased grip on the pole increases safety.

A fifth advantage is that it can be used in tight spaces which are unsuitable for large equipment. As an example, if a pole is to be removed or positioned, and the topography of the land does not allow heavy machinery, the apparatus discussed herein can be used in comparatively smaller spacers.

A sixth advantage is the versatility in the number of industries in which the apparatus and method can be used. The method and apparatus can be used in the construction industry to both remove, suspend, and supply materials. For example, the adapter can be coupled to a crane, and used to grab piers, beams, etc., and supply for the construction of a building. Thus, the adapter can be utilized in the construction, demolition, removal, suspension, etc. The adapter can also be used in the oil and gas industry for removing and/or suspending drill bits, drilling structure, etc. The adapter can also be used in the fencing industry to add and remove posts. Further, the adapter can be used in the rail road industry to add, remove, and handle rail road tracks and ties, as an example. Further, the adapter can be used by electricians to grab, position, and hold wire, cable, etc. Finally, the adapter can be used in search and rescue missions for pulling and removing debris. Often, after an earthquake, for example, heavy machinery cannot be positioned at a location to remove rubble and other debris in order to rescue trapped survivors. However, the portability of the adapter, in one embodiment, allows the adapter to be utilized to remove rubble and other debris to rescue survivors trapped beneath the debris.

While the adapter has been described, a method of utilizing the adapter will now be discussed. Further, while one method will be discussed, this is for illustrative purposes and should not be deemed limiting.

First, the adapter coupler 401 is coupled to a stump and pole extractor 10. As noted, in one embodiment the adapter coupler 401 has two ends. In one embodiment, both ends are coupled to the stump and pole extractor 10.

Next, a loop 404 is adjusted as necessary. The loop 404, in one embodiment, is adjusted to comprise a larger diameter than the pole 408 to be extracted. This allows the loop 404 to slip around the pole 408. The loop 404 diameter can be increased by feeding additional adapter coupler 401, such as cable, through the securing device 407 to provide additional length to form the loop 404.

Thereafter, in one embodiment, the adapter device 400 is positioned above the pole 408 to be extracted. As previously discussed, the adapter body 402 is slipped around the pole 408. After the adapter body 402 is around the top of the pole 508, the adapter body 402 is lowered so that the loop 404 is likewise around the pole 508. As noted above, in some embodiments the loop 404 is below the adapter body 402, and is therefore, slipped around the pole 408 before the adapter body 402.

Once the adapter body 402 is positioned around the pole 508, any slack in the loop 404 is removed so that the loop 404 is snug against the pole 408. In one embodiment, the stump and pole extractor 10 is manipulated to raise to put tension on the adapter coupler 401. This causes excess length to be pulled out of the securing device 407, which causes the loop 404 to tighten against the pole 408. When the loop 404 tightens, the pole 408 is pulled against the gripping edge 405.

Next, additional upward force is applied to the adapter coupler 401 by methods previously described. A portion of the upward force is redirected by the coupler guide 103 as a force pulling the pole 408 against the gripping edge 405. Consequently, the upward force supplied by the stump and pole extractor 10 simultaneously increases the grip on the pole 408 but also provides an upward force to remove the pole 408.

When sufficient upward force is applied, the adapter device 400 as well as the pole 408 will lift upward. As noted, in some embodiments, the adapter body 402 will pivot as a result of the upward force. In such embodiments, the pole 408 can make contact with both the gripping edge 405 and the guiding edge 406. For example, referring to FIG. 6, if the adapter body 402 were to rotate downward at a 30° angle at the location of the securing device 407, then the pole 408 could contact the upper portion of the guiding edge 406 as well as a portion of the gripping edge 405. In such a manner, the pole 408 is sandwiched between the edges and the tension of the loop 404.

Once the pole 408 has been retracted, such as from the ground, as an example, the pole 408 can be removed by removing the tension.

A pole 408, such as a pole with a concrete base, can be retracted in less than a few minutes after the stump and pole extractor 10 has been installed. As noted, virtually any pole 408 can be removed including metal poles or posts, telephone or utility poles, wooden posts, fence posts, structural posts, etc. The size of the adapter device 400 can be adjusted depending on the size of the pole 408 to be extracted.

While the invention has been particularly shown and described with reference to a preferred embodiment, it will be understood by those skilled in the art that various changes in form and detail may be made therein without departing from the spirit and scope of the invention.

ADDITIONAL DESCRIPTION

The following clauses are offered as further description of the disclosed invention.

Clause 1. An apparatus for coupling to a pole, said apparatus comprising:
  an adapter body comprising a first end and a second end;
  a guiding edge coupled to said first end of the adapter body;
  a gripping edge coupled to the second end of the adapter body;
  a securing device which couples an adapter coupler to said adapter body;
  at least one coupler guide which couples the adapter coupler to said second end;
  wherein said adapter coupler exits said coupler guide and forms a closed loop.

Clause 2. The apparatus of any preceding or proceeding claim wherein said adapter body comprises a circular shape.

Clause 3. The apparatus of any preceding or proceeding claim wherein said adapter body comprises a gate and at least one hinge.

Clause 4. The apparatus of any preceding or proceeding claim wherein said hinge comprises a locking mechanism, and optionally wherein the locking mechanism comprises a sheath.

Clause 5. The apparatus of any preceding or proceeding claim wherein said adapter comprises two hinges and one gate.

Clause 6. The apparatus of any preceding or proceeding claim wherein the guiding edge extends upward from the planar face of the adapter body.

Clause 7. The apparatus of any preceding or proceeding claim wherein the gripping edge extends upward and downward from the planar face of the adapter body.

Clause 8. The apparatus of any preceding or proceeding claim wherein the gripping edge comprises spikes.

Clause 9. The apparatus of any preceding or proceeding claim wherein at least one coupler guide comprises two coupler guides.

Clause 10. The apparatus of any preceding or proceeding claim wherein the adapter coupler comprises a single integral piece with a first end and a second end, wherein the first end extends through said securing device and to a first coupler guide, and wherein the second end extends through said securing device and to a second coupler guide, wherein the first and second ends meet at the loop, and wherein the loop is located between the first and second coupler guide.

Clause 11. The apparatus of any preceding or proceeding claim wherein said securing device comprises at least one coupler guide.

Clause 12. The apparatus of any preceding or proceeding claim wherein the securing device and the adapter body comprise a single integrally made piece.

Clause 13. The apparatus of any preceding or proceeding claim wherein said gripping edge and/or said guiding edge comprises a removable surface.

Clause 14. The apparatus of any preceding or proceeding claim wherein the gripping edge and/or the guiding edge comprises a knurled surface.

Clause 15. A system comprising:
 a pair of legs each having an upper end and a lower end;
 a pivot pin hingedly joining said legs together at said upper ends thereof, said pivot pin being adapted to suspend a winch above the ground;
 an adapter for coupling said pole to said winch, said adapter comprising:
  an adapter body comprising a first end and a second end;
  a guiding edge coupled to said first end of the adapter body;
  a gripping edge coupled to the second end of the adapter body;
  a securing device which couples an adapter coupler to said adapter body;
  at least one coupler guide which couples the adapter coupler to said second end;
  wherein said adapter coupler exits said coupler guide and forms a closed loop;
  wherein the adapter coupler couples to said winch.

Clause 16. The system of any preceding or proceeding claim further comprising a pair of ground-engaging feet being respectively secured to said lower ends of said legs, said feet extending laterally from said legs; and, a flexible connector retractable into one of said legs adapted to selectively connect said feet together.

Clause 17. The system of any preceding or proceeding claim wherein said gripping edge and/or the guiding edge comprises a removable surface.

Clause 18. The system of any preceding or proceeding claim wherein the adapter coupler comprises a single integral piece with a first end and a second end, wherein the first end extends through said securing device and to a first coupler guide, and wherein the second end extends through said securing device and to a second coupler guide, wherein the first and second ends meet at the loop, and wherein the loop is located between the first and second coupler guide.

Clause 19. The system of any preceding or proceeding claim wherein said securing device comprises at least one coupler guide.

Clause 20. The system of any preceding or proceeding claim wherein said adapter body comprises a gate.

What is claimed is:

1. An apparatus for coupling to a pole, said apparatus comprising:
 an adapter body comprising a first end and a second end;
 a guiding edge coupled to said first end of the adapter body;
 a gripping edge coupled to the second end of the adapter body;
 a securing device which couples an adapter coupler to said adapter body at said first end of the adapter body, wherein said adapter coupler comprises two free ends which exit from said securing device, and wherein said adapter coupler extends through said securing device, and wherein said securing device allows said adapter coupler to slide through and relative to said securing device;
 at least one coupler guide which couples the adapter coupler to said second end;
 wherein said adapter coupler is inserted through said securing device and extends into said at least one coupler guide, and exits said coupler guide to form a closed loop which surrounds and applies tension to said pole when in use;
 and wherein said adapter coupler slides through and relative to said coupler guide; wherein said adapter body comprises a gate and at least one hinge.

2. The apparatus of claim 1 wherein said adapter body comprises a circular shape.

3. The apparatus of claim 1 wherein said hinge comprises a locking mechanism.

4. The apparatus of claim 3 wherein the adapter body comprises two hinges and one gate.

5. The apparatus of claim 1 wherein said adapter body comprises a planar face and wherein the guiding edge extends upward from the planar face of the adapter body.

6. The apparatus of claim 1 wherein said adapter body comprises a planar face and wherein the gripping edge extends downward from the planar face of the adapter body.

7. The apparatus of claim 1 wherein at least one coupler guide comprises two coupler guides.

8. The apparatus of claim 1 wherein said securing device comprises at least one coupler guide, and wherein said adapter coupler extends from a free end, through said coupler guide, and into said coupler guide on said second end.

9. The apparatus of claim 1 wherein the securing device and the adapter body comprise a single integrally made piece.

10. The apparatus of claim 1 wherein the gripping edge comprises a knurled surface.

11. A system comprising:
 a pair of legs each having an upper end and a lower end;
 a pivot pin hingedly joining said legs together at said upper ends thereof, said pivot pin being adapted to suspend a winch above the ground;
 an adapter for coupling a pole to said winch, said adapter comprising:
  an adapter body comprising a first end and a second end;
  a guiding edge coupled to said first end of the adapter body;
  a gripping edge coupled to the second end of the adapter body;
  a securing device which couples an adapter coupler to said adapter body at said first end of the adapter body, wherein said adapter coupler comprises two free ends which exit from said securing device, and wherein said adapter coupler extends through said securing device;
  and wherein said securing device allows said adapter coupler to slide through and relative to said securing device;
  wherein said adaptor body is sized to receive said pole;
  at least one coupler guide which couples the adapter coupler to said second end;
  wherein said adapter coupler exits said coupler guide and forms a closed loop which surrounds and applies tension to said pole;

wherein the two ends of said adapter coupler couples to said winch and wherein said adapter body comprises a gate.

12. The system of claim 11 further comprising a pair of ground-engaging feet being respectively secured to said lower ends of said legs, said feet extending laterally from said legs; and, a flexible connector retractable into one of said legs adapted to selectively connect said feet together.

13. The apparatus of claim 1, wherein said apparatus is coupled to a pole to be extracted, wherein said free ends of said adapter coupler are attached to a machine which applies a force to said adapter coupler to cause said loop to apply tension to said pole.

* * * * *